Patented May 1, 1928.

1,668,382

UNITED STATES PATENT OFFICE.

CURT SCHROEDER AND ALFRED KEIL, OF BERLIN, GERMANY.

BASE FOR OINTMENTS.

No Drawing. Application filed February 12, 1926, Serial No. 87,945, and in Germany March 3, 1925.

This invention relates to the production of a material more particularly for use as a basis for or in conjunction with substances to be applied to the skin, such as face creams, cosmetics, ointments, rouge or the like.

According to this invention the material is manufactured by concentrating milk from which the fat has been removed, to a syrupy consistency, then mixing in zinc oxide with or without the addition of a neutral substance such as glycerine.

The fat-free milk is preferably concentrated in a vacuum and the zinc oxide in very finely divided form is stirred into the concentrated fat-free milk while still warm. A chemical action evidently takes place between the zinc oxide and the milk constituents, because the mass first becomes fluid and then hardens.

The product so obtained when mixed with some glycerine gives a viscous liquid, which, even on standing for a long time, remains homogeneous, and when applied to the skin produces a varnish-like covering which dries quickly, is flexible with the skin, does not crack or crease and in addition does not lose colour. On the other hand the product is soluble in water and can easily be removed by washing.

The product is an exceptionally good carrier for medicinal substances to be used externally, because it adheres to the part of the skin under treatment and obviates the necessity for plaster or bandages.

Rouges prepared with the material of this invention do not shine on the skin and do not run or run together even at relatively high temperatures, and such rouges may be removed very easily on washing, thereby rendering the use of a cream such as cold cream unnecessary for this purpose.

The following serves by way of example to illustrate how the material of this invention may be prepared:

75 parts of separated milk are evaporated under a vacuum to 25 parts, and 60 parts of finely divided zinc oxide are added under stirring while the evaporated milk is still warm. The mass, which at first is fairly viscous, soon becomes thin, whereupon 25 parts of glycerine are added and the whole mixture introduced into the three roller mill and passed twice therethrough.

We claim:

1. The manufacture of a product, more particularly for use as a basis or carrier for substances to be applied to the skin, which consists in mixing under stirring finely divided zinc oxide into a syrup obtained by concentrating separated or skim milk, whereby a compound is obtained, which comprises milk constituents and zinc oxide.

2. The manufacture of a product, more particularly for use as a basis or carrier for substances to be applied to the skin, which consists in mixing under stirring finely divided zinc oxide into a syrup obtained by concentrating separated or skim milk, with the further addition of an emollient like glycerine, whereby a compound is obtained which comprises milk constituents, zinc oxide and glycerine.

In testimony whereof we hereunto affix our signatures.

CURT SCHROEDER.
ALFRED KEIL.